US010807127B2

(12) United States Patent
Torabi et al.

(10) Patent No.: US 10,807,127 B2
(45) Date of Patent: Oct. 20, 2020

(54) INTELLIGENT SORTING OF MATERIALS THAT INCLUDE CERAMIC

(71) Applicant: International Business Machines Corporation, Armonk, NY (US)

(72) Inventors: Hossein Torabi, North York (CA); Robert Retchless, Toronto (CA); Christopher Kong, Aurora (CA); Hien Tan Nguyen, Toronto (CA); Siamack Jabbarzadeh Farshi, Toronto (CA)

(73) Assignee: International Business Machine Corporation, Armonk, NY (US)

( * ) Notice: Subject to any disclaimer, the term of this patent is extended or adjusted under 35 U.S.C. 154(b) by 45 days.

(21) Appl. No.: 16/288,178

(22) Filed: Feb. 28, 2019

(65) Prior Publication Data
US 2020/0276617 A1    Sep. 3, 2020

(51) Int. Cl.
| G06F 7/00 | (2006.01) |
| B07C 5/344 | (2006.01) |
| B07C 5/342 | (2006.01) |
| G06Q 10/00 | (2012.01) |

(52) U.S. Cl.
CPC .............. *B07C 5/344* (2013.01); *B07C 5/342* (2013.01); *G06Q 10/30* (2013.01)

(58) Field of Classification Search
None
See application file for complete search history.

(56) References Cited

U.S. PATENT DOCUMENTS

| 2002/0067797 A1* | 6/2002 | Safai ..................... A22B 5/00 |
| | | 378/54 |
| 2007/0187299 A1* | 8/2007 | Valerio .................... B09B 3/00 |
| | | 209/12.1 |
| 2017/0152104 A1 | 6/2017 | Grochowina | |

FOREIGN PATENT DOCUMENTS

| IN | 201611018608 A | 6/2016 |
| IN | 4828/MUM/2015 A | 6/2017 |

OTHER PUBLICATIONS

Bonifazi et al., "Imaging Spectroscopy Based Strategies for Ceramic Glass Contaminants Removal in Glass Recycling," Waste Management 26 (2006), Aug. 19, 2005, pp. 627-639. <http://citeseerx.ist.psu.edu/viewdoc/download?doi=10.1.1.607.8572&rep=rep1&type=pdf>.

Chandramohan et al., "Automated Waste Segregator," Academia.edu, printed Mar. 29, 2018, 7 pages. <http://www.academia.edu/25190385/Automated_Waste_Segregator>.

Dudhal et al., "Waste Segregation Using Programmable Logic Controller," International Journal for Technological Research in Engineering, vol. 1, issue 8, Apr. 2014, ISSN (Online): 2347-4718, pp. 593-595. <http://www.ijtre.com/images/scripts/2014010826.pdf>.

(Continued)

*Primary Examiner* — Yolanda R Cumbess
(74) *Attorney, Agent, or Firm* — Brian D. Welle

(57) ABSTRACT

An intelligent sorting apparatus includes sensors, bins, and a controller that is configured to use data from the sensors to intelligently sort items into one of the plurality of bins. The controller may use the sensors to determine whether an item includes one of ceramic, metal, or wet or dry waste, as the item traverses down a first, second, and/or third incline, respectively. The controller may route the item towards one of a ceramic bin when the item includes ceramic, metal bin when the item includes metal, wet bin when the item (Continued)

includes wet waste, or dry bin when the item includes dry waste.

20 Claims, 3 Drawing Sheets

(56) References Cited

OTHER PUBLICATIONS

Nighot et al., "Eco-Friendly Garbage Segregator Using Sensor," Tech-Chronicle: An International E-Journal on Emerging Trends in Science, Technology and Management, vol. 1, issue 3, Mar. 2016, ISSN No. 2454-1958, pp. 45-47. <http://techchronicle.in/wp-content/uploads/2016/05/11-Pooja-Nighot.pdf>.

* cited by examiner

INTELLIGENT SORTING OF MATERIALS THAT INCLUDE CERAMIC

BACKGROUND

The present disclosure relates to sorting materials, and more specifically, to intelligently sorting a plurality of materials, one of which is ceramic. There are increasing efforts to recycle products and an increased ability to recycle different materials. In some examples, it may be advantageous and/or necessary to sort different materials prior starting a recycling procedure.

SUMMARY

Aspects of the present disclosure relate to a method, system, and computer program product for intelligently sorting materials. An intelligent sorting apparatus may receive an item. The intelligent sorting apparatus may include a plurality of sensors, a plurality of bins, and a controller that includes a processor that is configured to route items towards one of the plurality of bins in response to data from one or more of the plurality of sensors. A method may include determining, by the controller via a first sensor of the plurality of sensors, whether the item includes ceramic as the item traverses down a first incline. The method may further include, in response to determining that the item includes ceramic, the controller routing the item toward a first bin of the plurality of bins. The method may further include, in response to determining that the item does not include ceramic, the controller routing the item toward other bins of the plurality of bins. The method may further include determining, by the controller via a second sensor of the plurality of sensors, whether the item includes metal as the item traverses down a second incline. The method may further include, in response to determining that the item includes metal, the controller routing the item toward a second bin of the plurality of bins. The method may further include, in response to determining that the item does not include metal, the controller routing the item toward a second bin of the plurality of bins. The method may further include determining, by the controller via a third sensor of the plurality of sensors, whether the item includes a threshold amount of moisture as the item traverses down a third incline. The method may further include, in response to determining that the item includes a threshold amount of moisture, the controller routing the item toward a third bin of the plurality of bins. The method may further include in response to determining that the item does not include a threshold amount of moisture, the controller routing the item toward a fourth bin of the plurality of bins.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
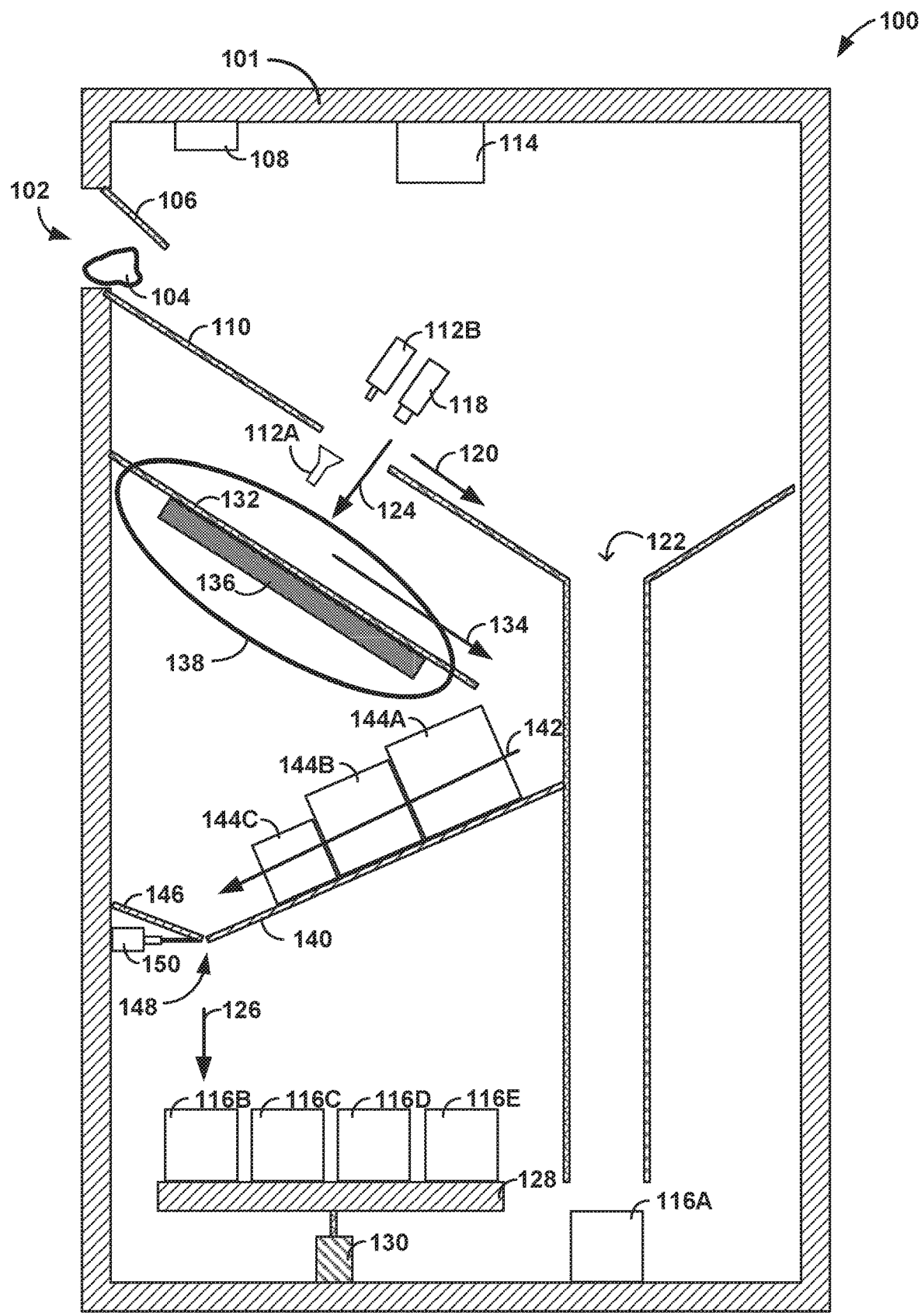
FIG. 1 depicts a conceptual and schematic illustration of an example intelligent sorting apparatus for intelligently sorting a plurality of materials, one of which is ceramic.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to sorting materials, more particular aspects relate to intelligently sorting a plurality of materials into respective bins based on materials including ceramic. In some examples, aspects of this disclosure may relate to sorting ceramic, metallic, wet, and dry materials into separate bins. An intelligent sorting apparatus may execute this sorting with a plurality of sensors. For example, an infrared sensor may determine whether an item includes ceramic, in response to which a controller may direct the waste toward or away from a ceramic bin. Similarly, an inductive coil may determine whether an item includes metal, in response to which a controller may direct the item toward or away from a metal bin. Further, the item may be directed to capacitive plates that may determine an amount of moisture within the item, in response to which the item may be directed toward or away from wet and dry bins. In certain examples, it may be determined whether the item is ceramic and/or metal before a moisture level of the item is determined. While the present disclosure is not necessarily limited to such applications, various aspects of the disclosure may be appreciated through a discussion of various examples using this context.

Intelligent sorting apparatuses may be used in a variety of applications, such as in waste management. Waste management may have a sizeable impact on the environment both in the short term and long term. An individual may generate around 4.4 pounds of waste per day which adds up to about 1,600 pounds of waste per year. Further, even though a majority of waste (e.g., more than 75% of waste) may be recyclable, in some examples a minority of waste (e.g., about 30%) may be recycled, even though many people (e.g., over 90% of people in some areas) have access to at least one form of recycling.

In some examples, recycling programs may include and/or depend on human users (e.g., the people who generated the waste) properly using discretion in placing their waste into a proper waste and/or recycling receptacle or bin. A waste processing agency (e.g., a trash collection and disposal organization and/or a recycling organization) may then collect the waste from the bins. Once collected, recycling organizations may use additional processes to further separate an assemblage of recycling materials (as previously stored communally within one or a plurality of respective bins) into respective homogenous groups of materials (e.g., a group of paper-based material, a group of tin, a group of ceramic, a group of glass, etc.).

Such processes may include a relatively substantial amount of slop (e.g., unusable material that must be discarded and may not be recycled) as a result of materials cross-contaminating each other, making a percentage of each material unsuitable for recycling. Further, such processes may generate an amount of slop as a result of humans incorrectly identifying a segment of waste (e.g., identifying it as recyclable when that segment is not recyclable, or identifying it as not recyclable when it is recyclable, or identifying it as belonging to a first recyclable group when it is more accurately identified as belonging to a second recyclable group) that results with that segment and/or adjacent segments of waste being discarded (e.g., not recycled). In some examples, using an intelligent sorting apparatus such as the one described herein may improve an ability to autonomously sort materials before those materials coexist in a single bin. Improving an ability to autonomously sort materials may increase (e.g., make better) recycling yields, therein reducing a negative impact of the waste on the environment.

FIG. 1 depicts a conceptual and schematic illustration of intelligent sorting apparatus 100. The relative size and arrangement of components within intelligent sorting apparatus 100 are depicted as in FIG. 1 for purposes of illustration only, as the components may define relatively different sizes or may be arranged differently in other examples. In some examples, intelligent sorting apparatus 100 may be integrated into a waste management system of a domicile or building. For example, intelligent sorting apparatus 100 may be integrated into a garbage shoot of a house or of an apartment complex. Alternatively, or additionally, intelligent sorting apparatus 100 may be integrated into a garbage receptacle. As such, intelligent sorting apparatus 100 may define housing 101 that is, e.g., approximately 1 meter wide, 1 meter deep, and 1.5 meters tall. Other dimensions are possible in other examples. Though intelligent sorting apparatus 100 is depicted as being within a single contiguous housing 101, in other examples intelligent sorting apparatus 100 may include a plurality of structures and/or components that may be physically separate from each other (e.g., putting some computing devices in a remote structure that is communicatively coupled to intelligent sorting apparatus 100).

Housing 101 of intelligent sorting apparatus 100 may define opening 102 through which intelligent sorting apparatus 100 may receive item 104. Item 104 may be waste. For example, item 104 may be recyclable waste. For example, item 104 may be predominantly ceramic, metallic, glass, or the like. Further, item 104 may be predominantly dry waste (e.g., paper-based material) or wet waste (e.g., compostable material).

Opening 102 may be a port through which a user may insert waste such as item 104. In some examples, intelligent sorting apparatus 100 may include flap 106 that is configured to cover some or all of opening 102 when "at rest" until flap 106 is pushed manually or automatically as intelligent sorting apparatus 100 receives item 104. Intelligent sorting apparatus 100 may include entry sensor 108 that detects the entry of item 104 within/through opening 102 of intelligent sorting apparatus. Entry sensor 108 may be an infrared sensor. Entry sensor 108 may be configured to detect item 104 by detecting motion of item 104 and/or flap 106 as intelligent sorting apparatus 100 receives item 104.

Intelligent sorting apparatus 100 may define first incline 110. First incline 110 may be a surface that is sloped downward from opening 102 such that item 104 traverses (e.g., falls along) first incline 110 (e.g., due to gravity and downward slope defined by first incline 110, or due to another mechanical advantage, such as a conveyor belt, as applied by intelligent sorting apparatus 100) once item 104 is inserted through opening 102. First incline 110 may be configured to route item 104 past source 112A and detector 112B (source 112A and detector 112B collectively referred to as "first sensor 112"). First sensor 112 may be configured to determine if item 104 includes ceramic. For example, first sensor 112 may be configured to determine if item 104 includes more than a threshold amount of ceramic (e.g., by percentage or weight of item 104). In some examples, ceramic may include ceramic glass, such as $Li_2O \times Al_2O_3 \times nSiO_2$ ceramic glass (which may be known LAS ceramic glass), $MgO \times Al_2O_3 \times nSiO_2$ ceramic glass (which may be known as MAS ceramic glass), or $ZnO \times Al_2O_3 \times nSiO_2$ ceramic glass (which may be known as ZAS ceramic glass), though other examples of ceramic are also possible. For example, in some situations first sensor 112 may be configured to determine if item 104 includes a non-glass ceramic such as a clay-based ceramic (e.g., ceramic pottery) or the like.

First sensor 112 may be configured to utilize imaging spectroscopy to determine if item 104 includes ceramic. For example, source 112A may include an infrared source and detector 112B may include an infrared detection system. Source 112A may emit infrared waves covering the visible wavelength range (400-1000 nanometers (nm)) and/or the near wavelength range (1000-1700 nm). Detector 112B may detect reflectance spectra when item 104 is physically between source 112A and detector 112B. For example, source 112A and detector 112B may be physically arranged within intelligent sorting apparatus 100 such that detector 112B may detect reflectance spectra when item 104 is in the path of infrared waves traveling from source 112A to detector 112B of first sensor 112.

Intelligent sorting apparatus 100 may be configured to determine if reflectance spectra detected by detector 112B indicate that item 104 includes ceramic as described herein. Intelligent sorting apparatus 100 may include controller 114 that is configured to determine if reflectance spectra as detected by detector 112B indicates that item 104 includes ceramic. Controller 114 may be physically or wirelessly communicatively coupled to source 112A and/or detector 112B to control first sensor 112 to determine if item 104 includes ceramic.

In some examples, controller 114 may be further configured to cause source 112A to start sending infrared waves. For example, controller 114 may receive a signal from entry sensor 108 indicating item 104 being received through opening 102 of intelligent sorting apparatus 100. In some examples, controller 114 may use information from the signal from entry sensor 108 to determine whether or not data from first sensor 112 indicates that item 104 includes ceramic. For example, entry sensor 108 may detect a general thickness (e.g., 1 centimeter, or 10 centimeters, or some other thickness) or shape (e.g., generally spherical or cylindrical or rectangular) that may improve an ability of controller 114 to determine whether reflectance spectra detected by detector 112B indicates that item 104 includes ceramic.

Controller 114 may be configured to route item 104 towards one of a plurality of bins 116A-116E (collectively, "bins 116") depending upon whether controller 114 determines that item 104 includes ceramic. For example, controller 114 may route item 104 toward one of bins 116 by actively directing or redirecting item 104 along a path or trajectory that may result in item 104 being received by the respective bin of bins 116. For another example, controller 114 may route item 104 toward one of bins 116 by passively enabling item 104 to traverse a path or trajectory that may result in item 104 being received by the respective bin of bins 116. For yet another example, controller 114 may route item 104 toward one of bins 116 by moving components of intelligent sorting apparatus 100 (e.g., such as bins 116 themselves) to align with and/or redirect a path or trajectory of item 104.

In some examples, intelligent sorting apparatus 100 may include jet 118 that is configured to route item 104. Jet 118 may be configured to produce a jet of a fluid such as gas (e.g., air) that is capable of moving item 104. Controller 114 may control jet 118 to route item 104. For example, if controller 114 uses first sensor 112 to determine that item 104 includes ceramic, controller 114 may cause jet 118 to not produce a jet of gas, such that item continues along path 120. Once item 104 is on path 120, item may proceed down chute 122 to be received by ceramic bin 116A of bins 116. For another example, if controller 114 uses first sensor 112 to determine that item 104 does not include ceramic, controller 114 may cause jet 118 to produce a jet of gas that routes item 104 along path 124 toward other bins 116B-116E of bins 116.

In certain examples, controller 114 may use first sensor 112 to determine that item 104 includes glass (e.g., includes at least a threshold amount or percentage of glass). In response to determining that item 104 includes glass, controller 114 may route item 104 toward glass bin 116B of bins 116. Controller 114 may route item 104 toward glass bin 116B by moving glass bin 116B such that glass bin 116B aligns with path 126 that item 104 may follow as a result of item 104 being moved by a gas jet of jet 118. For example, glass bin 116B may be one of a plurality of bins 116B-116E that is on movable platform 128. Moveable platform 128 may be, e.g., rotatable by motor 130 that is controlled by controller 114, such that controller 114 may cause moveable platform 128 to rotate until glass bin 116B is aligned with (e.g., directly at the bottom of) path 126 of item 104.

In some examples, intelligent sorting apparatus 100 is configured to determine whether item 104 is metallic. Intelligent sorting apparatus 100 may be configured such that jet 118 routes item 104 along path 124 towards second incline 132 in response to controller 114 determining that item 104 does not include ceramic. Once on second incline 132, item 104 may move along path 134 (e.g., due to gravity and downward slope as defined by second incline 132, or due to another mechanical advantage as applied by intelligent sorting apparatus 100). While on second incline 132, intelligent sorting apparatus 100 may determine whether or not item 104 includes a threshold amount of percentage of metal. For example, intelligent sorting apparatus 100 may include second sensor 136 configured to determine if item 104 includes metal.

Second sensor 136 may include an inductance coil. Second sensor 136 may further include or otherwise be electrically coupled to a parallel inductance and capacitance circuit. Second sensor 136 may be configured to generate magnetic field 138 through which item 104 traverses as item 104 follows path 134 along second incline 132. For example, second sensor 136 may send an alternating current through an inductance coil to generate magnetic field 138. In some examples, controller 114 may cause second sensor 136 to generate magnetic field 138. For example, controller 114 may cause second sensor 136 to generate magnetic field 138 in response to detecting that item 104 does not include ceramic and/or glass. Alternatively, controller 114 may cause second sensor 136 to generate magnetic field 138 in response to detecting (e.g., with entry sensor 108) that item 104 has been received through opening 102.

Where item 104 includes metal, the metal of item 104 may inductively couple with the inductance coil of second sensor 136 as a result of the alternating current sent through the inductance coil. Such inductive coupling may create eddy currents. Controller 114 may use second sensor 136 to determine whether or not eddy currents are created as item 104 traverses through magnetic field 138. For example, controller 114 may identify that eddy currents are detected by identifying a changing impedance of the parallel inductance and capacitance circuit of second sensor 136. Controller 114 may determine that item 104 includes metal in response to controller 114 detecting eddy currents. In some examples, controller 114 may determine that item 104 includes metal when controller 114 detects a change of an impedance of second sensor 136 that satisfies a threshold.

In response to determining that item 104 includes metal, controller 114 may route item 104 toward metal bin 116C of bins 116. Controller 114 may route item 104 toward metal bin 116C by moving metal bin 116C such that metal bin 116C aligns with path 126 that item 104 may follow as a result of item 104 following path 134. For example, similar to above, metal bin 116C may be one of a plurality of bins 116B-116E that is on movable platform 128, where moveable platform 128 is rotatable by motor 130 that is controlled by controller 114, such that controller 114 may cause moveable platform 128 to rotate until metal bin 116C is aligned with (e.g., directly at the bottom of) the final path 126 of item 104.

Intelligent sorting apparatus 100 may be configured such that controller 114 determines whether item 104 includes metal a plurality of times while item 104 is on second incline 132. For example, controller 114 may determine whether item 104 includes a threshold amount or percentage of metal five, ten, or fifteen times as item 104 traverses path 134 along second incline 132. Controller 114 may then average or otherwise compare many or all of these readings to determine whether or not item 104 includes metal.

In some examples, controller 114 may only determine whether item 104 includes metal in response to determining that item 104 includes neither ceramic nor glass as described herein. For example, where controller 114 determines that item 104 includes glass and routes item 104 towards glass bin 116B using jet 118, controller 114 may enable item 104 to traverse second incline 132 without creating magnetic field 138. In other examples, controller 114 may determine whether item 104 includes metal whenever item 104 is routed toward second incline 132. In such examples, when controller 114 determines that item 104 includes both glass and metal, controller 114 may route item 104 towards the respective bin of bins 116 that item 104 includes relatively more of (e.g., where controller 114 determines that item 104 includes relatively more glass controller 114 may route item 104 towards glass bin 116B, and where controller 114 determines that item 104 includes relatively more metal controller 114 may route item towards metal bin 116C). Alternatively, where controller 114 determines that item 104 includes both glass and metal, controller 114 may automatically route item 104 toward a predetermined bin of bins 116. For example, controller 114 may be configured to always route item 104 toward glass bin 116B when item 104 includes glass (e.g., even if item 104 also includes metal), or controller 114 may be configured to always route item 104 toward metal bin 116C when item 104 includes metal (e.g., even if item 104 also includes glass).

Intelligent sorting apparatus 100 may be configured to determine whether item 104 includes wet waste or dry waste. Wet waste may include organic material that includes water, fat, oil, or the like, such that the wet waste is compostable or may otherwise be used to acquire methane gas. Dry waste may include materials that did not include ceramic, glass, metal, or wet material as described herein. For example, dry waste may include paper, wood, recyclable polymers, or the like. In some examples, dry waste may include non-recyclable materials, such that all manner of waste may be processed/sorted by intelligent sorting apparatus 100. In some examples, intelligent sorting apparatus 100 may only determine whether item 104 includes wet waste or dry waste in response to determining that item 104 includes substantially no ceramic, glass, and/or metal (e.g., includes less than a threshold amount or percentage of the respective materials). For example, where controller 114 determines that item 104 includes one of ceramic, glass, or metal as described herein, controller 114 may route item 104 toward one of ceramic bin 116A, glass bin 116B, or metal bin 116C without determining if item 104 includes wet waste or dry waste.

Intelligent sorting apparatus 100 may be configured to determine whether item 104 includes wet waste or dry waste on third incline 140 as item 104 traversed along path 142 (e.g., due to gravity and downward slope as defined by third incline 140, or due to another mechanical advantage as applied by intelligent sorting apparatus 100). Item 104 may traverse path 142 along third incline 140 subsequent to item 104 traversing second incline 132 (which may itself be traversed subsequent to first incline 110). Item 104 may fall from second incline 132 directly to third incline 140 due to an arrangement of second incline 132 and third incline 140 (e.g., item 104 falls off a bottom edge of second incline 132 and subsequently impacts a top portion of third incline 140 to traverse third incline 140).

Intelligent sorting apparatus 100 may utilize pairs of capacitive plates 144A, 144B, 144C to determine whether item 104 includes dry waste or wet waste. Collectively, all of the pairs of capacitive plates 144A-144C comprise third sensor 144. Each pair of capacitive plates 144A-144C may be made of a capacitive material such as, e.g., copper. Intelligent sorting apparatus 100 may be configured such that item 104 traverses an initial portion of third incline 140 between first pair of capacitive plates 144A, then traverses a medial portion of third incline 140 between second pair of capacitive plates 144B, then traverses a subsequent portion of third incline 140 between third pair of capacitive plates 144C.

As depicted, each capacitive plate of first pair of capacitive plates 144A defines a larger surface area than each capacitive plate of second pair of capacitive plates 144B. Further, as depicted, each capacitive plate of second pair of capacitive plates 144B define a larger surface area than each capacitive plate of third pair of capacitive plates 144C. Capacitive plates of third sensor 144 may be configured to detect moisture of item 104. Capacitive plates with a relatively smaller surface area may be relatively more sensitive (e.g., more likely to detect a relatively smaller amount of moisture) than capacitive plates with a relatively larger surface area. In this way, third sensor 144 may be configured to detect moisture of item 104 whether item 104 is relatively small (e.g., and therein includes a relatively small amount of moisture) or item 104 is relatively big (e.g., and therein includes a relatively large amount of moisture). As such, intelligent sorting apparatus 100 may be configured to identify if item 104 includes wet or dry waste regardless of a relative size of item 104.

Controller 114 may use third sensor 144 to determine if item 104 includes wet or dry waste. Controller 114 may identify a dielectric constant of item 104 to determine if item 104 includes wet or dry waste. Controller 114 may identify that item 104 includes wet waste if an identified dielectric constant of item 104 satisfies a threshold level. In some examples, capacitance values of the different pairs of capacitive plates 144A-144C may be different as a result of the different sizes of the respective pairs. As such, controller 114 may compare identified dielectric constants to different thresholds depending upon which pair of capacitive plates 144A-144C is identifying the dielectric constant. In other examples, some pairs of capacitive plates 144A-144C may define relatively similar sizes. Further, though three pairs of capacitive plates 144A-144C are depicted in FIG. 1 for purposes of illustration, in other examples intelligent sorting apparatus 100 may include more or less pairs of capacitive plates.

In response to determining that item 104 includes wet waste or dry waste, controller 114 may route item 104 toward wet bin 116D or dry bin 116E of bins 116. Controller 114 may route item 104 toward wet or dry bin 116D, 116E by moving the respective bin such that the respective bin aligns with path 126 that item 104 may follow as a result of item 104 following path 134. For example, similar to above, wet and dry bin 116D, 116E may be one of a plurality of bins 116B-116E that are on movable platform 128, where moveable platform 128 is rotatable by controller 114 such that controller 114 may cause moveable platform 128 to rotate until wet or dry bin 116D, 116E is aligned with (e.g., directly at the bottom of) path 126 of item 104.

Intelligent sorting apparatus 100 may be configured such that controller 114 determines whether item 104 includes wet or dry waste a plurality of times while item 104 is on third incline 140. For example, controller 114 may determine whether item 104 includes a threshold amount or percentage of wet material multiple times (e.g. five, ten, or fifteen times) as item 104 traverses path 142 along third incline 140. Controller 114 may then average or otherwise compare many or all of these readings or determinations to determine whether or not item 104 includes wet material.

In some examples, intelligent sorting apparatus 100 may include flap 146 that is configured to move to define opening 148 through which item 104 may traverse to be received by one of bins 116. For example, flap 146 may be actuated by motor 150 that is configured to cause flap 146 to move, e.g., toward an exterior wall of intelligent sorting apparatus 100 to define opening 148. When motor 150 causes flap 146 to move, item 104 may be routed towards one of bins 116 along path 126 as described herein. In some examples, flap 146 may be rigid enough such that flap 146 is configured to hold item 104 in place at a location at an intersection of flap 146 and third incline 140 until flap 146 is moved by motor 150.

Controller 114 may control flap 146 using motor 150. Controller 114 may cause motor 150 to move flap 146 in response to a respective bin of bins 116 being routed to a location that is aligned with path 126 that item 104 will take once controller 114 causes flap 146 to move. In some examples, motor 150 may be configured to move flap 146 toward an initial position at which flap 146 does not define opening 148 in response to item 104 moves through opening 148. For example, motor 150 may be configured to move flap 146 toward the initial position such that only one item 104 may traverse along path 126 toward a respective bin of bins 116 (e.g., even if a plurality of items 104 are on third incline 140). In this way, in examples where a plurality of items 104 are stacked along third incline 140, controller 114 may route each of these items 104 individually toward a respective bin of bins 116 by, e.g., moving the moveable platform 128 to align a respective bin with path 126 after each respective individual item 104 traverses opening 148.

Figure 2:
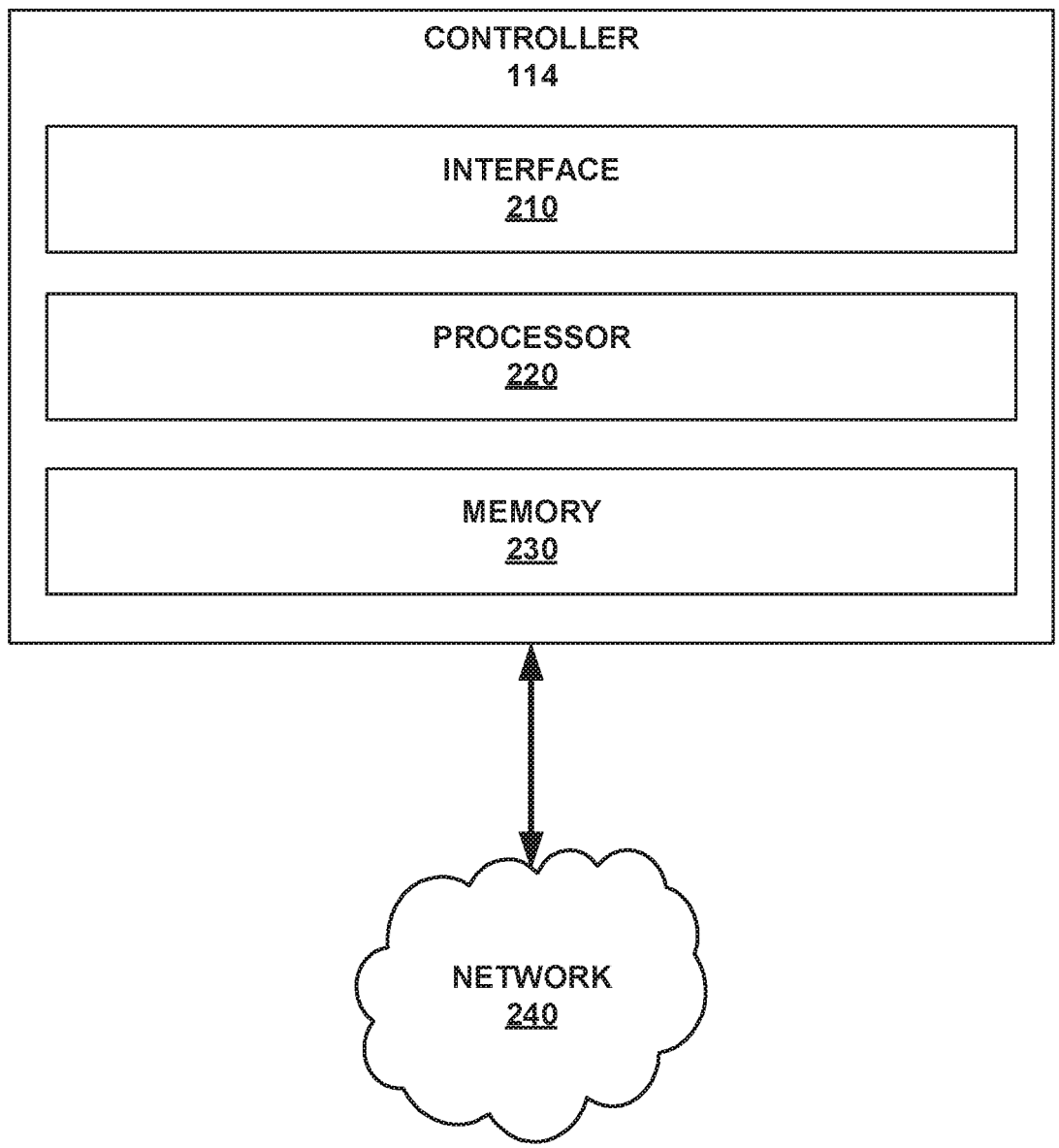
FIG. 2 depicts a conceptual and schematic illustration of an example computing device that may be configured to intelligently sort one or more materials using the intelligent sorting apparatus of FIG. 1.

In some examples, controller 114 may be part of a computing system that is, e.g., configured to interact with devices external to intelligent sorting apparatus 100. For example, FIG. 2 is a conceptual and schematic diagram of system 200 that includes controller 114. While controller 114 is depicted as a single entity (e.g., within a single housing) for the purposes of illustration, in other example controller 114 may include two or more discrete physical systems (e.g., within two or more discrete housings). Controller 114 may include interfaces 210, processor 220, and memory 230. Controller 114 may include any number or amount of interface 210, processor 220, and/or memory 230.

Controller 114 may include components that enable controller 114 to communicate with (e.g., send data to and receive and utilize data transmitted by) devices that are external to controller 114. For example, controller 114 may include interface 210 that is configured to enable controller 114 and components within controller 114 (e.g., such as processor 220) to communicate with entities external to controller 114. Specifically, interface 210 may be configured to enable components of controller 114 to communicate with, e.g., entry sensor 108, first sensor 112, second sensor 136, third sensor 144, and motors 130, 150. In some examples, interface 210 may include a service data objects framework to ensure that components of controller 114 are accessed in a uniform manner. Interface 210 may include one or more network interface cards, such as Ethernet cards, and/or any other types of interface devices that can send and receive information. Any suitable number of interfaces may be used to perform the described functions according to particular needs.

As discussed herein, controller 114 may be configured to intelligently sort materials such as item 104 into one of a plurality of bins 116, such as described above. Controller 114 may utilize processor 220 to intelligently sort materials. Processor 220 may include, for example, microprocessors, digital signal processors (DSPs), application specific integrated circuits (ASICs), field-programmable gate arrays (FPGAs), and/or equivalent discrete or integrated logic circuit. Two or more of processor 220 may be configured to work together to intelligently sort materials.

Processor 220 may intelligently sort materials according to instructions stored on memory 230 of controller 114. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, or forms of electrically programmable memories (EPROM), or electrically erasable and programmable memories (EEPROM). In some examples, processor 220 may intelligently sort materials according to instructions of one or more applications (e.g., software applications) stored in memory 230 of controller 114.

In addition to instructions, in some examples thresholds or the like as used by processor 220 to intelligently sort materials may be stored within memory 230. For example, memory 230 may store reflectance spectra values that indicate that item 104 is ceramic or glass (e.g., such that if data from sensor 112 indicates that item 104 satisfies these stored reflectance spectra then controller determines that item satisfies ceramic or glass threshold), or memory 230 may store inductance values that indicate that item 104 is metal, or memory 230 may store one or more moisture levels (e.g., one range of inductance values per pair of capacitance plates 144A-144C) that indicate whether item 104 includes wet waste versus dry waste. Other types of values or predetermined ranges may also be stored within memory 230 for use by processor 220 in intelligently sorting materials.

In some examples, controller 114 may be directly physically coupled to other components of intelligent sorting apparatus 100 (e.g., hard-wired to entry sensor 108, first sensor 112, second sensor 136, third sensor 144, motor 130, or motor 150). In other examples, controller 114 may be wirelessly communicatively coupled to other components of intelligent sorting apparatus 100. For example, interface 210 may enable processor 220 to receive data from one or more sensors of intelligent sorting apparatus 100 via network 240. Further, controller 114 may use network 240 to access (or be accessed by) components or computing devices that are external to intelligent sorting apparatus 100. For example, an administrator may use a laptop or the like to update threshold values or instructions with which processor 220 intelligently sorts items that are received by intelligent sorting apparatus. Network 240 may include one or more private or public computing networks. For example, network 240 may comprise a private network (e.g., a network with a firewall that blocks non-authorized external access). Alternatively, or additionally, network 240 may comprise a public network, such as the Internet. Although illustrated in FIG. 2 as a single entity, in other examples network 240 may comprise a combination of public and/or private networks.

Figure 3:
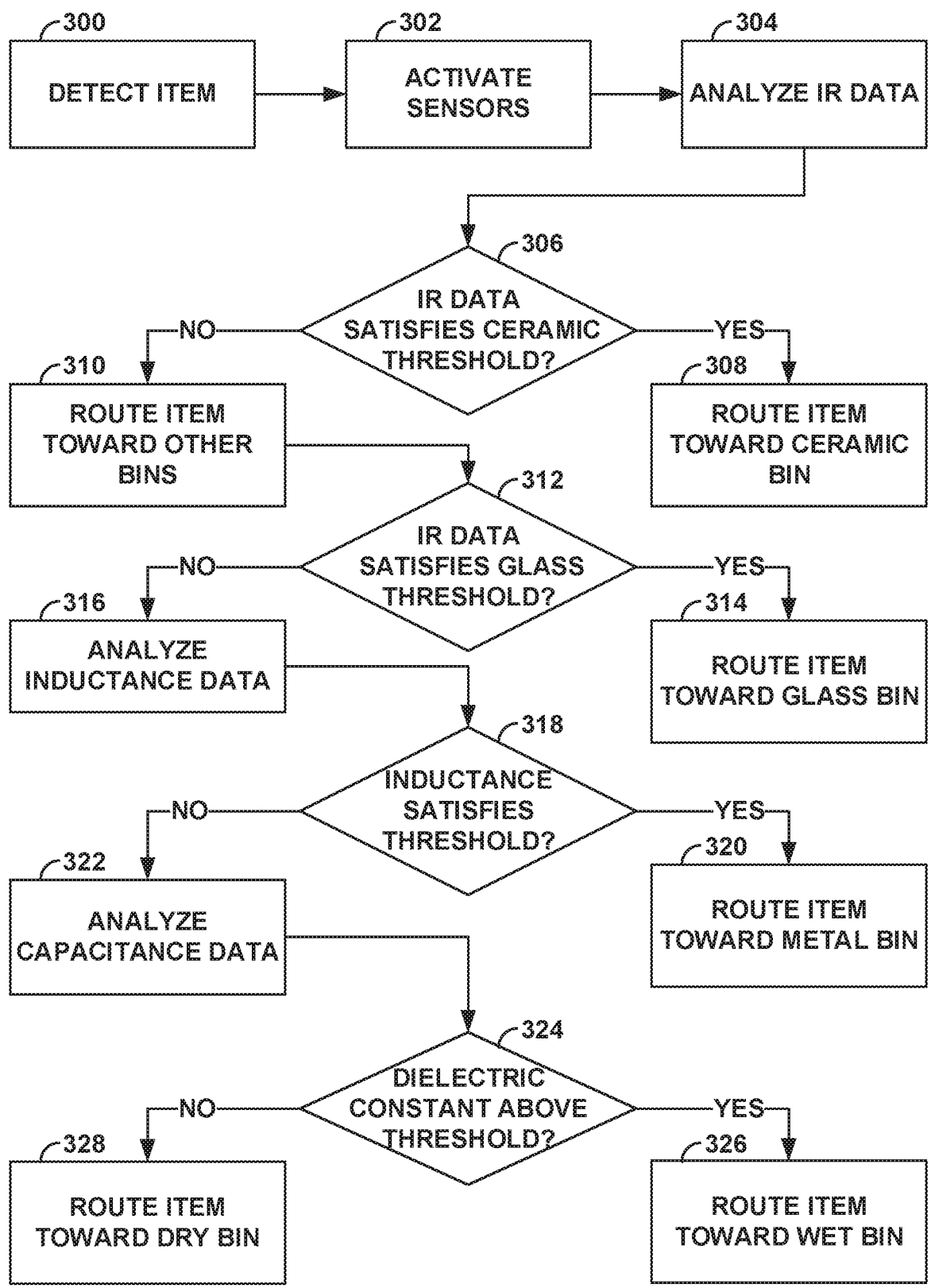
FIG. 3 depicts a flowchart of an example method of intelligently sorting a plurality of materials.

Using these components, system 200 may intelligently sort materials as discussed herein. For example, controller 114 of system 200 may intelligently sort materials according to the flowchart depicted in FIG. 3. Though the flowchart of FIG. 3 is discussed with relation to the intelligent sorting apparatus 100 of FIG. 1 and the system 200 of FIG. 2 for purposes of clarity, it is to be understood that the flowchart of FIG. 3 may be executed with other apparatuses or by other controllers in other examples. Further, in other examples intelligent sorting apparatus 100 and/or controller 114 may intelligently sort items according to other methods. For example, items may be intelligently sorted by material according to more or less operations than are depicted in the flowchart of FIG. 3, and/or items may be intelligently sorted according to substantially similar steps that are executed in different orders.

Controller 114 may detect that item 104 is received by intelligent sorting apparatus 100 (300). Controller 114 may detect that item 104 is received through opening 102. Controller 114 may detect item 104 using entry sensor 108 that detects motion of item 104 and/or flap 106 that covers opening 102. In response to receiving item 104, controller 114 may activate sensors (e.g., first sensor 112, second sensor 136, and/or third sensor 144) of intelligent sorting apparatus 100 (302). In some examples, such sensors and/or other components of intelligent sorting apparatus 100 may be in a "low power" state prior to such activation. In certain examples, entry sensor 108 may be substantially always activated (e.g., not in a low-power state) in order to detect item 104 being received by intelligent sorting apparatus 100. Alternatively, substantially all components of intelligent sorting apparatus 100 may be left in a "low power" state until a manual operation by a human that is utilizing intelligent sorting apparatus 100 (e.g., pressing an on button or the like).

Controller 114 may analyze the infrared data gathered by first sensor 112 (304). For example, controller 114 may identify reflectance spectra detected by detector 112B of first sensor 112 in response to item 104 traversing between source 112A and detector 112B of first sensor 112 adjacent first incline 110. Controller 114 may determine whether reflectance spectra values indicate that item 104 includes ceramic (306). When controller 114 determines that reflectance spectra values indicate that item 104 includes ceramic, controller 114 may route item toward ceramic bin 116A (308). Controller 114 may determine that reflectance spectra values of item 104 indicate that item 104 is ceramic if reflectance spectra values of item 104 are within a threshold range of ceramic reflectance spectra values. This threshold range of ceramic reflectance spectra values may be stored within memory 230 of controller 114.

Controller 114 may route item toward ceramic bin 116A by causing item 104 to traverse path 120 toward chute 122 that is aligned with ceramic bin 116A (e.g., by not rerouting item 104 with jet 118). Alternatively, when controller 114 determines that reflectance spectra values indicate that item 104 does not include ceramic, controller 114 may route item 104 toward other bins 116B-116E (310). For example, controller 114 may route item 104 toward second incline 132 using jet 118.

Controller 114 may determine whether reflectance spectra values indicate that item 104 includes glass (312). Controller 114 may determine whether reflectance spectra values indicate that item 104 includes glass using first sensor 112. If the infrared data indicates that item 104 has reflectance spectra that satisfy the glass threshold (e.g., item 104 has reflectance spectra values that are within a threshold range of glass reflectance spectra values that are stored within memory 230), controller 114 routes item 104 toward glass bin 116B (314). Controller 114 may route item 104 toward glass bin 116B by moving a moveable platform 128 upon which glass bin 116B is arranged at a predetermined location until the predetermined location of glass bin 116B is aligned with path 126 of item 104. Controller 114 may further route item 104 toward glass bin 116B by moving flap 146 to define opening 148 toward glass bin 116B in response to glass bin 116B being moved to align with path 126 and/or item 104 resting (e.g., without kinetic energy) at the intersection of flap 146 and third incline 140.

Controller 114 may analyze inductance data (316). Controller 114 may analyze inductance data from second sensor 136. Controller 114 may analyze inductance data from second sensor 136 to determine whether or not item 104 includes metal (318). For example, controller 114 may determine whether or not inductance data gathered from second sensor 136 is high enough to surpass a threshold percentage or amount. The threshold percentage or amount may be a predetermined percentage or amount that is stored within memory 230 of controller 114. If controller 114 determines that item 104 includes the threshold percentage or amount of metal, controller 114 may route item 104 toward metal bin 116C (320). Controller 114 may route item 104 toward metal bin 116C by moving metal bin 116C via motor 130 that moves moveable platform 128 upon which metal bin 116 is located until metal bin 116C is aligned with a path 126 of item 104. Controller 114 may further route item 104 toward metal bin 116C by moving flap 146 to define opening 148 toward metal bin 116C in response to metal bin 116C being moved to align with path 126 and/or item 104 resting at the intersection of flap 146 and third incline 140.

Controller 114 may analyze capacitance data gathered by intelligent sorting apparatus 100 (322). In some examples, controller 114 may only analyze capacitance data as described herein in response to controller 114 determining that item 104 does not include a threshold amount of ceramic, glass, and/or metal. Controller 114 may receive capacitance data from third sensor 144. Controller 114 may analyze capacitance data by identifying a dielectric constant from capacitance data (e.g., a dielectric constant of item 104). Controller 114 may determine whether the identified dielectric constant of item 104 is higher than a threshold amount (324). The threshold amount referenced by controller 114 may be stored in memory 230 of controller 114). If controller 114 determines that item 104 has a dielectric constant above the threshold, controller 114 routes item 104 toward wet bin 114D (326). If controller determines that item 104 has a dielectric constant below the threshold, controller 114 routes item 104 toward dry bin 116E (328). As discussed above, controller 114 may route item 104 toward wet or dry bin 116D, 116E by moving moveable platform 128.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   receiving an item in an intelligent sorting apparatus that comprises:
     a plurality of sensors;
     a plurality of bins; and
     a controller that includes a processor that is configured to route the item toward one of the plurality of bins in response to data from one or more of the plurality of sensors;
   determining, by the controller via a first sensor of the plurality of sensors, whether the item includes ceramic as the item traverses down a first incline;
   in response to determining that the item includes ceramic, the controller routing the item toward a first bin of the plurality of bins;
   in response to determining that the item does not include ceramic, the controller routing the item toward other bins of the plurality of bins;
   determining, by the controller via a second sensor of the plurality of sensors, whether the item includes metal as the item traverses down a second incline;
   in response to determining that the item includes metal, the controller routing the item toward a second bin of the plurality of bins;
   in response to determining that the item does not include metal, the controller routing the item toward a second bin of the plurality of bins;
   determining, by the controller via a third sensor of the plurality of sensors, whether the item includes a threshold amount of moisture as the item traverses down a third incline;
   in response to determining that the item includes a threshold amount of moisture, the controller routing the item toward a third bin of the plurality of bins; and
   in response to determining that the item does not include a threshold amount of moisture, the controller routing the item toward a fourth bin of the plurality of bins.

2. The method of claim 1, further comprising the controller detecting the intelligent sorting apparatus receiving the item through a port of the intelligent sorting apparatus using an infrared sensor located adjacent the port.

3. The method of claim 1, wherein the controller is configured to route the item toward the second and third and fourth bin by moving the respective second and third and fourth bin to align with a trajectory of the item from the third incline.

4. The method of claim 1, wherein the controller routes the item toward the other bins in response to determining that the item does not include ceramic via a jet that is configured to produce a jet of gas to direct the item toward the second incline.

5. The method of claim 1, wherein the first sensor is an infra-red sensor.

6. The method of claim 1, wherein the second sensor includes an inductive coil.

7. The method of claim 1, wherein the third sensor includes one or more pairs of capacitive plates configured to determine a dielectric constant of the item.

8. The method of claim 7, wherein the one or more pairs of capacitive plates includes a first pair and a second pair and the first pair defines a substantially larger surface area than the second pair.

9. The method of claim 1, further comprising:
determining, by the controller via the first sensor, whether the item includes glass as the item traverses down the first incline;
in response to determining that the item includes glass, the controller routing the item toward a fifth bin of the plurality of bins.

10. The method of claim 1, wherein the controller is configured to only determine whether the item includes the threshold amount of moisture in response to determining both that the item does not include ceramic and that the item does not include metal.

11. An intelligent sorting apparatus comprising:
a plurality of sensors;
a first and second and third incline
a plurality of bins;
a processor; and
a memory in communication with the processor, the memory containing program instructions that, when executed by the processor, are configured to cause the processor to:
determine, via a first sensor of the plurality of sensors, whether an item received by the intelligent sorting apparatus includes ceramic as the item traverses down the first incline;
in response to determining that the item includes ceramic, route the item toward a first bin of the plurality of bins;
in response to determining that the item does not include ceramic, route the item toward other bins of the plurality of bins;
determine via a second sensor of the plurality of sensors, whether the item includes metal as the item traverses down the second incline;
in response to determining that the item includes metal, route the item toward a second bin of the plurality of bins;
in response to determining that the item does not include metal, route the item toward a second bin of the plurality of bins;
determine, via a third sensor of the plurality of sensors, whether the item includes a threshold amount of moisture as the item traverses down the third incline;
in response to determining that the item includes a threshold amount of moisture, route the item toward a third bin of the plurality of bins; and
in response to determining that the item does not include a threshold amount of moisture, route the item toward a fourth bin of the plurality of bins.

12. The intelligent sorting apparatus of claim 11, wherein the controller is configured to route the item toward the second and third and fourth bin by moving the respective second and third and fourth bin to align with a trajectory of the item from the third incline;
wherein the first sensor is an infra-red sensor.

13. The intelligent sorting apparatus of claim 11, wherein the second sensor includes an inductive coil.

14. The intelligent sorting apparatus of claim 11, wherein the third sensor includes one or more pairs of capacitive plates configured to determine a dielectric constant of the item.

15. The intelligent sorting apparatus of claim 14, wherein the one or more pairs of capacitive plates includes a first pair and a second pair and the first pair defines a substantially larger surface area than the second pair.

16. A computer program product, the computer program product comprising a computer readable storage medium having program instructions embodied therewith, the program instructions executable by an intelligent sorting apparatus that comprises a plurality of sensors and a plurality of bins to cause the intelligent sorting apparatus to:
determine, via a first sensor of the plurality of sensors, whether an item received by the intelligent sorting apparatus includes ceramic as the item traverses down a first incline;
in response to determining that the item includes ceramic, route the item toward a first bin of the plurality of bins;
in response to determining that the item does not include ceramic, route the item toward other bins of the plurality of bins;
determine via a second sensor of the plurality of sensors, whether the item includes metal as the item traverses down a second incline;
in response to determining that the item includes metal, route the item toward a second bin of the plurality of bins;
in response to determining that the item does not include metal, route the item toward a second bin of the plurality of bins;
determine, via a third sensor of the plurality of sensors, whether the item includes a threshold amount of moisture as the item traverses down a third incline;
in response to determining that the item includes a threshold amount of moisture, route the item toward a third bin of the plurality of bins; and
in response to determining that the item does not include a threshold amount of moisture, route the item toward a fourth bin of the plurality of bins.

17. The computer program product of claim 16, the computer program product further including instructions executable by the intelligent sorting apparatus to cause the intelligent sorting apparatus to route the item toward the second and third and fourth bin by moving the respective second and third and fourth bin to align with a trajectory of the item from the third incline.

18. The computer program product of claim 16, the computer program product further including instructions executable by the intelligent sorting apparatus to cause the intelligent sorting apparatus to route the item toward the other bins in response to determining that the item does not include ceramic via a jet that is configured to produce a jet of gas to direct the item toward the second incline.

19. The computer program product of claim 16, the computer program product further including instructions executable by the intelligent sorting apparatus to cause the intelligent sorting apparatus to:
   determine, via the first sensor, whether the item includes glass as the item traverses down the first incline;
   in response to determining that the item includes glass, route the item toward a fifth bin of the plurality of bins.

20. The computer program product of claim 16, the computer program product further including instructions executable by the intelligent sorting apparatus to cause the intelligent sorting apparatus to only determine whether the item includes the threshold amount of moisture in response to determining both that the item does not include ceramic and that the item does not include metal.

* * * * *